G. McNEEL.
POCKET CHECK PROTECTOR.
APPLICATION FILED NOV. 14, 1918.
1,298,073.
Patented Mar. 25, 1919.
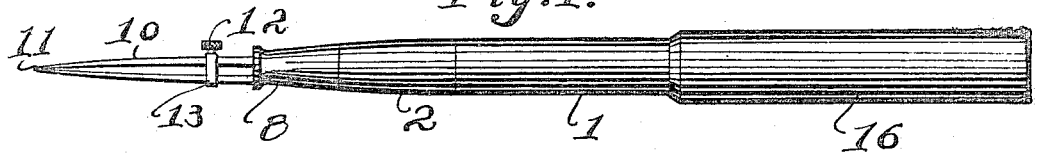
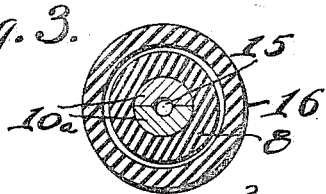
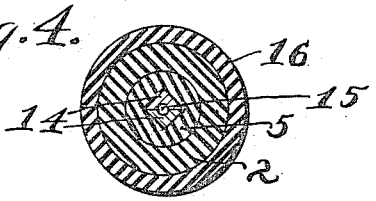
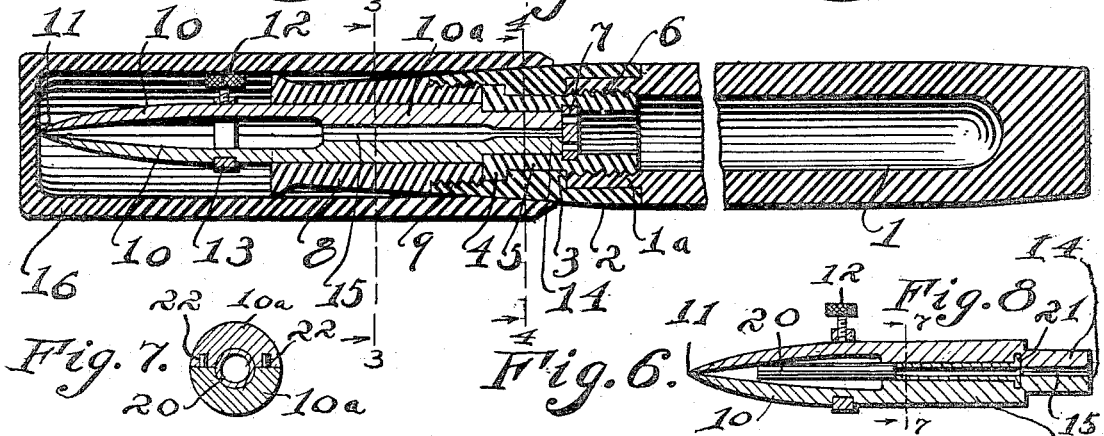
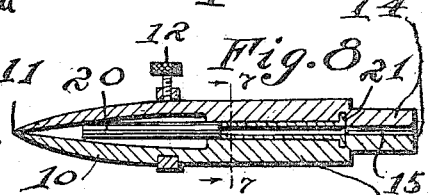
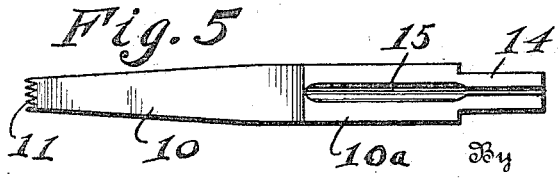
Inventor
GRANT McNEEL
By
N. S. Kie
Attorney

UNITED STATES PATENT OFFICE.

GRANT McNEEL, OF NORTH PLATTE, NEBRASKA.

POCKET CHECK-PROTECTOR.

1,298,073.                  Specification of Letters Patent.    Patented Mar. 25, 1919.

Application filed November 14, 1918.  Serial No. 262,499.

*To all whom it may concern:*

Be it known that I, GRANT MCNEEL, a citizen of the United States, residing at North Platte, in the county of Lincoln, State of Nebraska, have invented a new and useful Pocket Check-Protector; and I do hereby declare the following to be a full, clear, and exact description of the invention, such as will enable others skilled in the art to which it appertains to make and use the same.

The present invention relates to a pocket check protector and has for its object to provide a device of this character which embodies novel features of construction whereby the writer of a check can indicate the amount for which the check is payable by characters formed of inked ruptures or perforations, thereby rendering it impossible for the check to be successfully raised before being cashed.

Further objects of the invention are to provide a check writing implement which can be carried in the pocket in the same manner as a pen, which is comparatively inexpensive in its construction, and which is suitable for use by the average small bank depositor who would not be justified in purchasing an expensive check writing machine, but who desires to write his checks in such a manner that they can not be fraudulently raised before being cashed at the bank.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a check writing implement constructed in accordance with the invention.

Fig. 2 is an enlarged longitudinal sectional view through the same, portions being broken away.

Fig. 3 is a transverse sectional view on the line 3—3 of Fig. 2.

Fig. 4 is a similar view on the line 4—4 of Fig. 2.

Fig. 5 is a detail view of one of the blades of the pen.

Fig. 6 is a plan view of a check on which the amount for which the check is payable is indicated by characters formed with the present check writing device.

Figs. 7 and 8 are detail sectional views of a slightly modified form of pen, Fig. 7 being a transverse sectional view on the line 7—7 of Fig. 8.

Corresponding and like parts are referred to in the following description and indicated in all the views of the drawings by the same reference characters.

Referring to the drawings, which indicate one embodiment of the invention, the numeral 1 designates a reservoir or hollow barrel which may be formed of rubber or other suitable material, and which is intended to contain a supply of ink. The open end of the barrel is reduced at $1^a$ and has a collar 2 slipped thereon, said collar being formed with an interior shoulder 3 which is engaged by the flange 4 of a sleeve 5. This sleeve is threaded at 6 in the mouth of the barrel 1 and a cross bar 7 extends transversely across the passage through the sleeve. The outer end of the opening through the sleeve 5 is square or polygonal in cross section, as indicated more clearly by Fig. 4.

A tubular end-piece 8 projects from the collar 2 and has a threaded connection therewith, as indicated at 9. The complemental side pieces or blades 10 of the pen project from the end-piece 8 and have the base portions $10^a$ thereof fitted in the end-piece. The projecting ends of the blades 10 are bowed outwardly away from each other in the same manner as a ruling pen, while the base portions $10^a$ are substantially semi-circular in cross-section so that when fitted together they form a cylindrical plug which is received within the tubular end-piece 8. The outer ends of the blades 10 terminate in transversely extending toothed edges 11, the width of the edges corresponding to the height of the characters which will ordinarily be used for indicating the amount for which the check is written. The toothed edges 11 of the two blades 10 are brought into close proximity with each other and maintained in an adjusted position by means of a screw 12 in a band 13 which surrounds the projecting ends of the blades 10 at an intermediate point in the length thereof. The ink will be received between the bowed outer ends of the blades 10 so that when the toothed ends 11 of the blades are forced downwardly upon a sheet of paper, a series of ruptures or perforations will be formed in the paper, and the edges of these ruptures or perforations will be saturated with ink.

Shanks 14 project longitudinally from the base portions 10ª of the blades 10, said shanks being substantially triangular in cross section and fitted together to form a square or polygonal shank which is slidably received within the polygonal outer end of the opening through the sleeve 5. The meeting faces of the shanks 14 and base portions 10ª of the blades are formed with longitudinal grooves 15 which coöperate with each other to provide an ink duct or passage leading from the upper end of the blades to the space between the bowed outer ends of the blades. The blades of the pen are slidable longitudinally in the tubular end-piece 8 and sleeve 5, and when they are moved inwardly the shanks 14 engage the cross bar 7 so that the duct formed by the grooves 15 is shut off from communication with the interior of the barrel 1.

A cap 16 fits over the pen when the latter is not in use, as indicated by Fig. 2, although when it is desired to use the pen the cap 16 is removed and fitted upon the opposite end of the barrel, as indicated by Fig. 1. The pen can be easily carried in the pocket and the cap holds the blades pushed back into the tubular end-piece so that leakage of ink from the barrel is prevented when the pen is not in use. When it is desired to use the pen, the cap 16 is removed, the blades 10 of the pen pulled outwardly a slight amount to open the duct formed by the grooves 15 and permit a suitable quantity of ink to flow from the barrel 1 into the space between the bowed outer ends of the blades 10. The blades are then moved back to shut off the flow of ink, after which the toothed ends 11 thereof can be successively pushed down on the face of the check in proper manner to form characters such as are indicated at 17 on Fig. 6. A blotter is preferably placed under the check while the characters are being formed, and it will be obvious that each character is formed by a series of perforations or ruptures of which the edges are saturated with ink, so that any alteration of the check is practically impossible. When forming a character having a curved line a corner of the toothed edge 11 of the pen is used.

A slight modification is shown by Figs. 7 and 8, in which a feed tube 20 is interposed between the blades 10 and extends to within a short distance of the pointed outer ends thereof, thereby providing for carrying the ink down to the outer ends of the blades without loss. The upper end of the feed tube 20 is provided with a flange 21 which engages and interlocks with corresponding seats in the enlarged upper ends of the blades, the feed tube being seated in the lower end of the duct formed by the grooves 15 and communicating with the upper end of the duct extending through the shanks 14 so as to receive the ink from the reservoir and convey it without loss to the outer ends of the blades 10. By reference to Fig. 7 it will be noted that one of the blades 10 is provided on the flat inner face thereof with positioning pins 22 which enter corresponding recesses in the face of the opposite blade, thereby locking the two blades against lateral displacement relative to each other.

Having thus described the invention what I claim as new and desire to secure by Letters Patent, is:—

1. A check writing pen, including a handle, and a pair of complemental bowed blades projecting from the handle and terminating in corresponding transversely extending toothed edges adapted to form a line of perforations when the pen is forced against a sheet of paper.

2. A check writing pen, including a hollow barrel, a tubular end-piece at the mouth of the barrel, a pair of complemental blades projecting from the barrel and having a base portion which is slidable within the tubular end-piece, said blades terminating in corresponding transversely extending toothed edges adapted to form a line of perforations when the pen is forced against a sheet of paper, and means controlled by the sliding movement of the blades for governing the flow of ink from the barrel to the blades.

3. A check writing pen including a hollow barrel, a cross piece extending across the mouth of the barrel, a tubular end-piece projecting from the mouth of the barrel, a pair of complemental blades formed with a base portion which is slidable in the tubular end-piece and movable toward and away from the cross piece, said base portion of the blades being formed with a duct leading to the space between the blades and said duct being closed when the base portion of the blades is moved rearwardly against the cross piece, the outer ends of the blades terminating in corresponding transversely extending toothed edges adapted to form a line of perforations when the pen is forced against a sheet of paper.

4. A check writing pen including a hollow barrel, a tubular end-piece projecting from the mouth of the barrel, an interior sleeve arranged within the mouth of the barrel and formed with a cross bar, a pair of complemental blades formed with base portions which are slidable in the tubular end-piece, said base portions being provided with shanks which extend into the interior sleeve and the meeting faces of the base portions and shanks being formed with corresponding grooves providing an ink duct leading to the space between the blades, the upper end of the ink duct being closed when the blades are moved inwardly and the before mentioned shanks brought into engagement with the cross bar of the sleeve, the outer ends of the blades terminating in corresponding edges which are held in coöperative relation to each other.

5. A check writing pen including a hollow barrel, a tubular end-piece projecting from the mouth of the barrel, an interior sleeve fitted in the mouth of the barrel and formed with a cross bar, the bore of the sleeve at the outer end thereof being polygonal in cross section, a pair of complemental blades formed with base portions which slide within the tubular end-piece, shanks being provided which project longitudinally from the base portions of the blades and having a polygonal cross section so as to slide in the polygonal portion of the bore of the sleeve, the shanks and base portions of the blades being provided in their meeting faces with corresponding grooves forming an ink passage leading to the space between the blades and which passage is closed when the shanks are moved inwardly into engagement with the cross bar of the sleeve, the outer ends of the blades terminating in corresponding edges which are held in coöperative relation to each other.

In testimony whereof I have signed my name to this specification in the presence of two subscribing witnesses.

GRANT McNEEL.

Witnesses:
G. SHARPLEY THOMPSON,
FRED A. BRINK.